United States Patent [19]

Kadota et al.

[11] Patent Number: 5,465,773
[45] Date of Patent: Nov. 14, 1995

[54] PNEUMATIC RADIAL TIRES WITH ZIGZAG BELT AND RUBBERIZED CORD PLY BELT REINFORCING LAYER

[75] Inventors: Kuninobu Kadota, Higashimurayama; Hiroyuki Koseki; Kenji Toyoda, both of Kodaira, all of Japan

[73] Assignee: Bridgestone Corporation, Tokyo, Japan

[21] Appl. No.: 229,749

[22] Filed: Apr. 19, 1994

[30] Foreign Application Priority Data

Apr. 30, 1993 [JP] Japan ................................ 5-104397

[51] Int. Cl.$^6$ ............................... B60C 3/00; B60C 9/18
[52] U.S. Cl. .................... 152/454; 152/526; 152/533; 152/538; 156/117
[58] Field of Search ........................ 152/454, 533, 152/538, 526; 156/117

[56] References Cited

U.S. PATENT DOCUMENTS

| | | |
|---|---|---|
| 3,024,828 | 3/1962 | Smith et al. . |
| 3,422,874 | 1/1969 | Weitzel ................................. 152/533 |
| 3,550,667 | 12/1970 | Bartley et al. ......................... 152/533 |
| 3,589,426 | 6/1971 | Varner ................................... 152/533 |
| 3,598,166 | 8/1971 | Wells ................................. 152/533 X |
| 3,616,001 | 10/1071 | Addis ................................. 156/117 X |
| 3,674,079 | 7/1972 | Varner ............................... 152/533 X |
| 3,720,569 | 3/1973 | Kimble ............................... 152/533 X |
| 3,746,590 | 7/1973 | Bartley et al. ....................... 152/533 X |
| 3,748,203 | 7/1973 | Greene ............................... 156/117 X |
| 4,002,789 | 1/1977 | Klein ................................. 152/533 X |
| 4,600,456 | 7/1986 | Oswald ................................. 156/117 |
| 4,838,966 | 6/1989 | Oswald ............................... 152/533 X |

FOREIGN PATENT DOCUMENTS

| | | |
|---|---|---|
| 0300779 | 1/1989 | European Pat. Off. . |
| 0501782 | 9/1992 | European Pat. Off. . |
| 48-96259 | 11/1973 | Japan . |
| 2216076 | 10/1989 | United Kingdom . |
| WO8803481 | 5/1988 | WIPO . |
| WO9202380 | 2/1992 | WIPO . |

*Primary Examiner*—Adrienne C. Johnstone
*Attorney, Agent, or Firm*—Sughrue, Mion, Zinn, Macpeak & Seas

[57] ABSTRACT

A pneumatic radial tire for heavy duty vehicles comprises a radial carcass, a belt, a belt reinforcing layer and a tread, in which the belt has a particular structure formed by using a rubberized strip containing one or more cords therein, and the belt reinforcing layer comprised of at least one rubberized cord ply in a region corresponding to at least each side region of the tread, and the belt and the belt reinforcing layer satisfy a ratio $h/h_0$ of not more than 65%. In the tire of the above structure, the occurrence of shoulder wear is controlled together with the avoidance of belt end separation and the durability is improved.

7 Claims, 8 Drawing Sheets

FIG_1

FIG_4

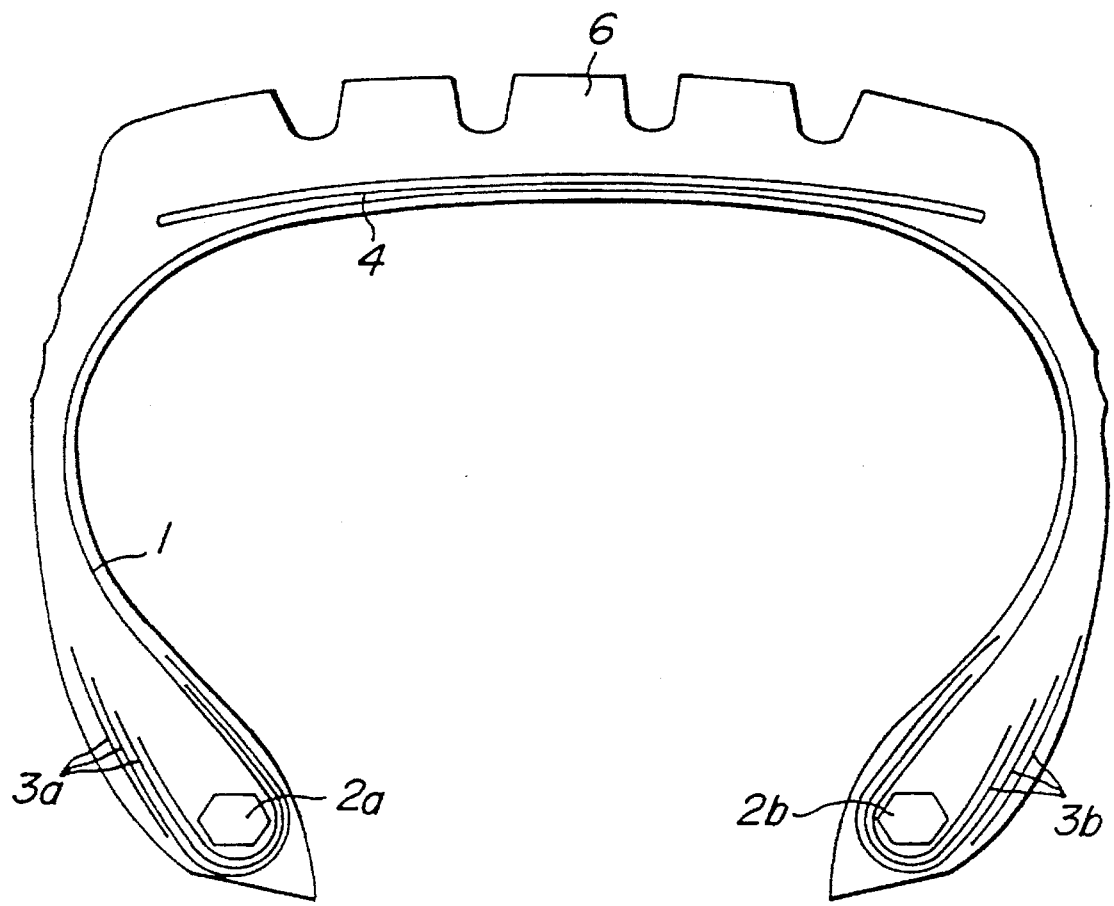
FIG_9
COMPARATIVE

PNEUMATIC RADIAL TIRES WITH ZIGZAG BELT AND RUBBERIZED CORD PLY BELT REINFORCING LAYER

BACKGROUND OF THE INVENTION

1. Field of the Invention

This invention relates to pneumatic radial tires, and more particularly to a pneumatic heavy duty radial tire for truck and bus use under a higher internal pressure which avoids separation failure at the belt end by specifying the arrangement of cords constituting the belt.

2. Description of the Related Art

JP-Y-48-96259 discloses a truck and bus type tire wherein a belt having no cut surface of cord at its end is formed by bending cords slantly extended with respect to an equatorial plane of the tire at a widthwise end of the belt to zigzag extend in a circumferential direction of the tire for avoiding the occurrence of separation failure at the belt end.

In such a belt, the cords are crossed with each other at the widthwise end of the belt and are continuously extended at an axially bent state, so that no cord shifting occurs between upper and lower belt layers at the belt end. Hence the stretching of the belt end in the circumferential direction is very small as compared with the conventional belt structure where rubberized cord plies having a given width are laminated one upon the other so as to cross the cords of the upper and lower plies with each other. This is particularly true when in case of using high modulus cords such as steel cords and the like are used.

On the other hand, a distance or a diameter from a rotational axis of the tire to an outer surface of a tread is small in an widthwise end of the tread than in a widthwise central portion of the tread, i.e. there is a difference in diameter between tread end and tread center. As a result, a shearing deformation in the circumferential direction is apt to be caused at the widthwise end of the tread locating within a ground contact area during running under load in the case of heavy duty pneumatic tires for truck and bus use having a large diameter difference. The shearing deformation creates a large slipping between tread end surface and road surface, and consequently brings about a so-called shoulder wear the tread end is prematurely worn compared with the other portion of the tread. For this end, the belt cord plies are laminated one upon the other so as to cross the cords of the upper and lower plies with each other, whereby the stretching of the belt end in the circumferential direction is ensured to absorb the diameter difference between the central portion of the tread in widthwise direction and the widthwise end thereof.

However, when the belt having a very small stretching in the circumferential direction at the belt end is used as mentioned above, since the stretching in the circumferential direction can not be expected at the belt end, it is difficult to absorb the diameter difference between the widthwise central portion and widthwise end of the tread and hence the occurrence of shoulder wear is not avoided. Such an occurrence of shoulder wear still remains a serious problem in the tire using the belt having no cut surface of cord at the belt end for avoiding the belt end separation.

As a means for controlling the shoulder wear, it has also considered to render the contour of the tread surface into a crown shape having a large radius of curvature for reducing the diameter difference between the central portion and end portion of the tread. In this case, however, the ground contact pressure rises at the tread end to increase the heat build-up and hence it is apt to be caused the separation failure at the belt end.

SUMMARY OF THE INVENTION

It is, therefore, an object of the invention to provide a pneumatic radial tire capable of controlling the occurrence of shoulder wear together with the avoidance of belt end separation.

According to the invention, there is the provision of a pneumatic radial tire comprising a radial carcass toroidally extending between a pair of bead cores, a belt superimposed about the carcass, a belt reinforcing layer laid on the belt and a tread laid thereon, in which the belt is formed by zigzag and continuously extending a rubberized strip containing one or more cords therein substantially in a circumferential direction of the tread so as to slantly extend with respect to an equatorial plane of the tire from one end to the other end at both side edges of the belt through an axially bent state at each side edge, and the belt reinforcing layer is comprised of at least one rubberized cord ply containing plural cords slantly arranged with respect to the equatorial plane in a region corresponding to at least each side region of the tread, and the belt and the belt reinforcing layer satisfy a relationship that a distance from an intersection point between a normal line of a rotational axis of the tire passing through an outermost widthwise end of the belt and an outer surface of the tread to a position of maximum tire diameter is not more than 65% of a distance from an intersection point between a normal line of a rotational axis of the tire passing through an outermost widthwise end of the belt reinforcing layer and an outer surface of the tread to a position of maximum tire diameter.

In a preferred embodiment of the invention, the belt reinforcing layer is comprised of two rubberized cord plies, the cords of which plies being crossed with each other at an inclination cord angle with respect to the equatorial plane larger than that of the belt.

BRIEF DESCRIPTION OF THE DRAWINGS

The invention will be described with reference to the accompanying drawings, wherein:

FIG. 9 is a diagrammatically sectional view of a comparative embodiment of the pneumatic radial tire.

DESCRIPTION OF THE PREFERRED EMBODIMENTS

In FIGS. 1 to 4 are shown various embodiments of the pneumatic radial tire according to the invention. In these figures, numeral 1 is a radial carcass toroidally extending between a pair of bead cores 2a and 2b. Moreover, the carcass 1 is comprised of one carcass ply in the illustrated embodiments. The carcass 1 is provided about each of the bead cores 2a, 2b with three bead portion reinforcing layers 3a, 3b, two of which layers being turned around the bead core from outside of the tire to inside thereof.

Figure 4:
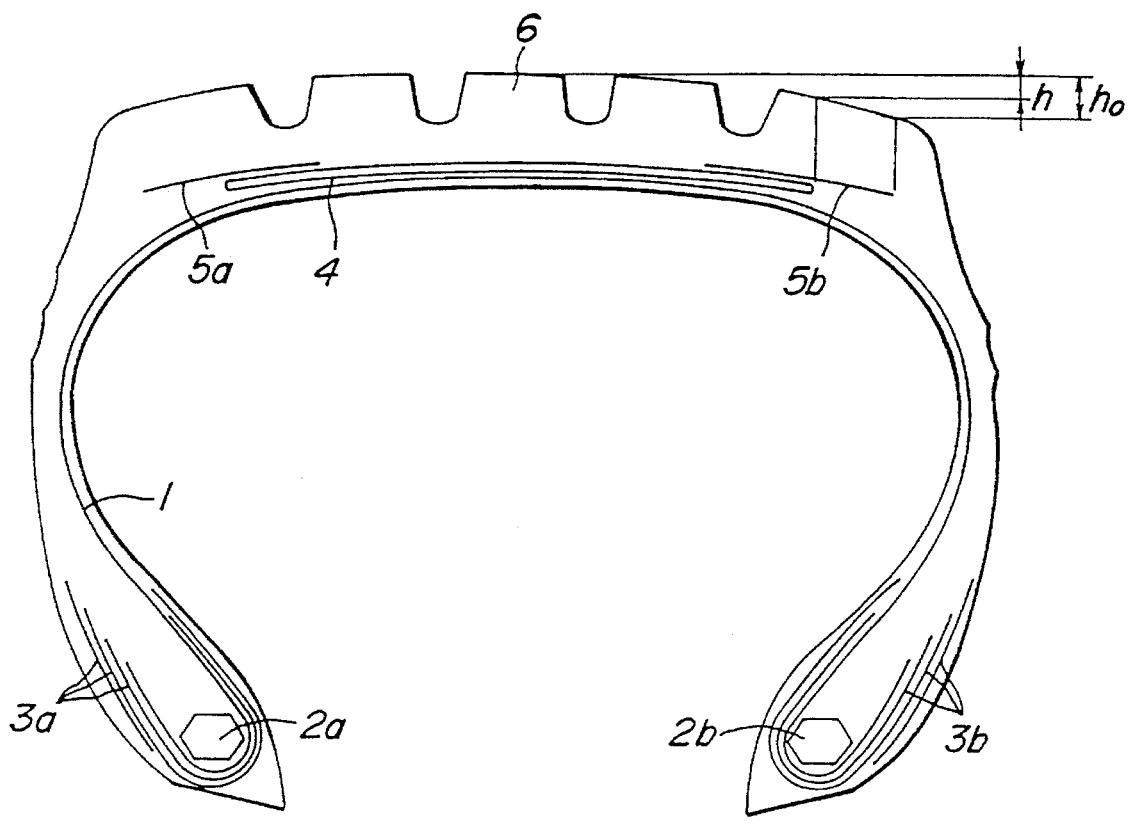
FIG. 4 is a diagrammatically sectional view of a fourth embodiment of the pneumatic radial tire according to the invention.
Figure 5:
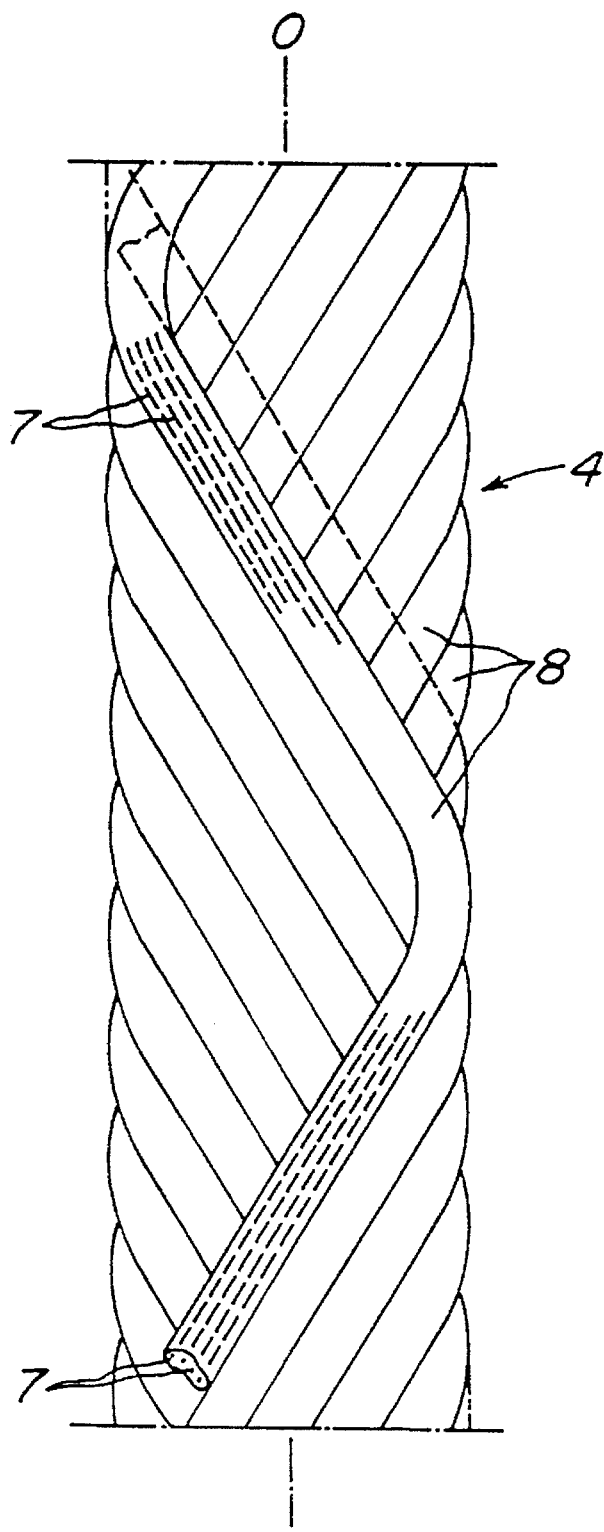
FIG. 5 is a developed schematic view of an embodiment of the belt used in the invention.
Figure 7:
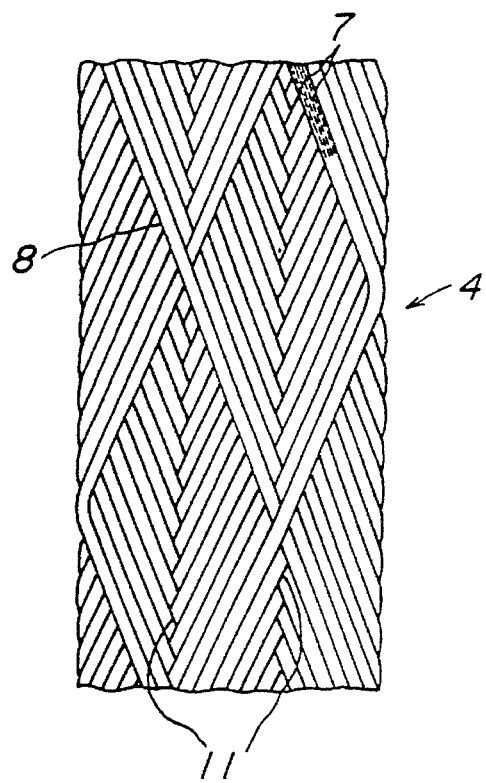
FIG. 7 is a developed schematic view of another embodiment of the belt used in the invention.

Further, a belt 4, a belt reinforcing layer 5 (or 5a and 5b in FIGS. 2 and 4) and a tread 6 are laid on the carcass 1 in a radial direction of the tire in this order. As shown in FIG. 5 or 7, the belt 4 is formed by extending a rubberized strip 8 containing plural cords 7 (or a single cord) slantly arranged with respect to an equatorial plane 0 of the tire from one widthwise end of the belt to the other widthwise end thereof, axially bending at the other end so as to change the inclination with respect to the equatorial plane 0 in an opposite direction, extending from the other end to the one end, again axially bending at the one end to change the inclination with respect to the equatorial plane 0 in an opposite direction. The above procedure is repeated zigzag and continuously extend the strip substantially in the circumferential direction of the tire. In the illustrated embodiments, the resulting belt 4 has a two-layer structure.

Figure 1:
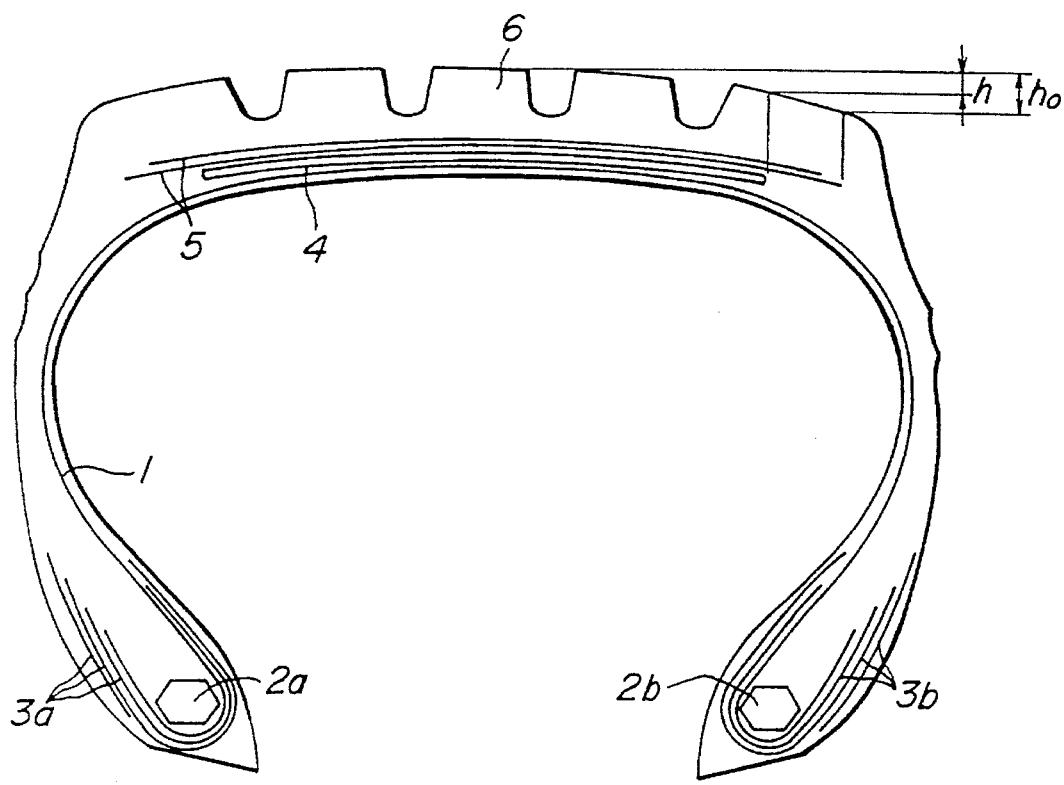
FIG. 1 is a diagrammatically sectional view of a first embodiment of the pneumatic radial tire according to the invention.
Figure 2:
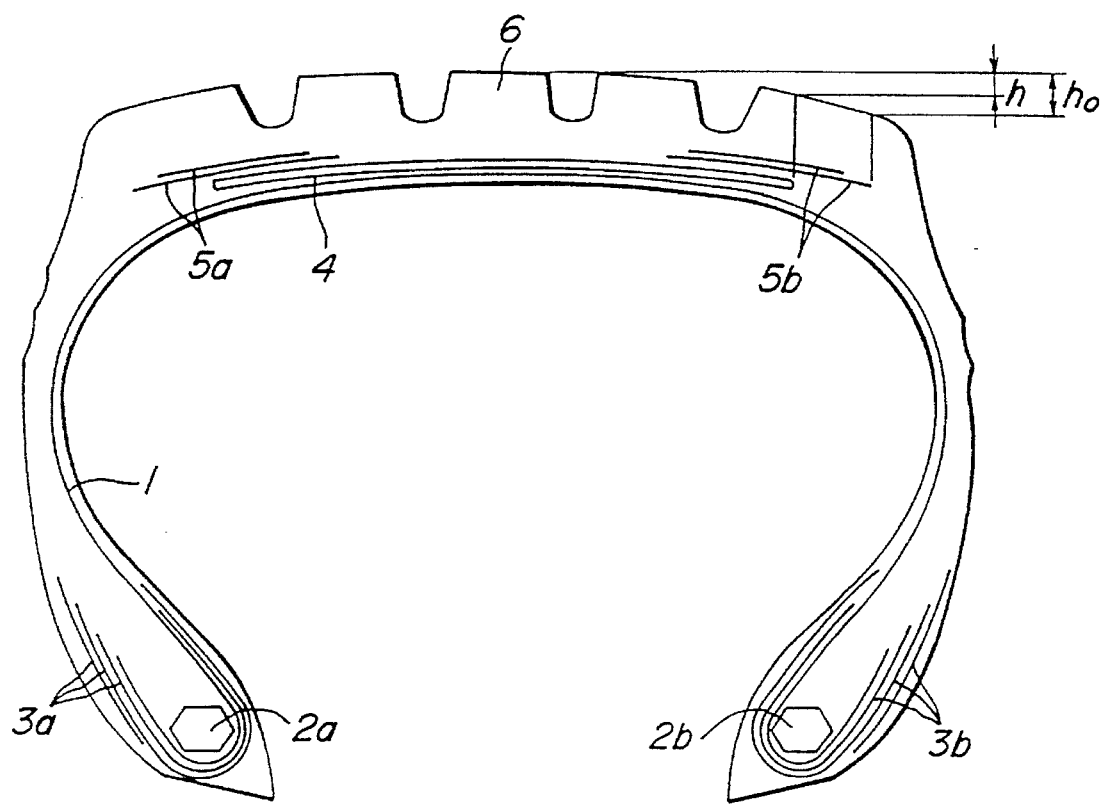
FIG. 2 is a diagrammatically sectional view of a second embodiment of the pneumatic radial tire according to the invention.
Figure 3:
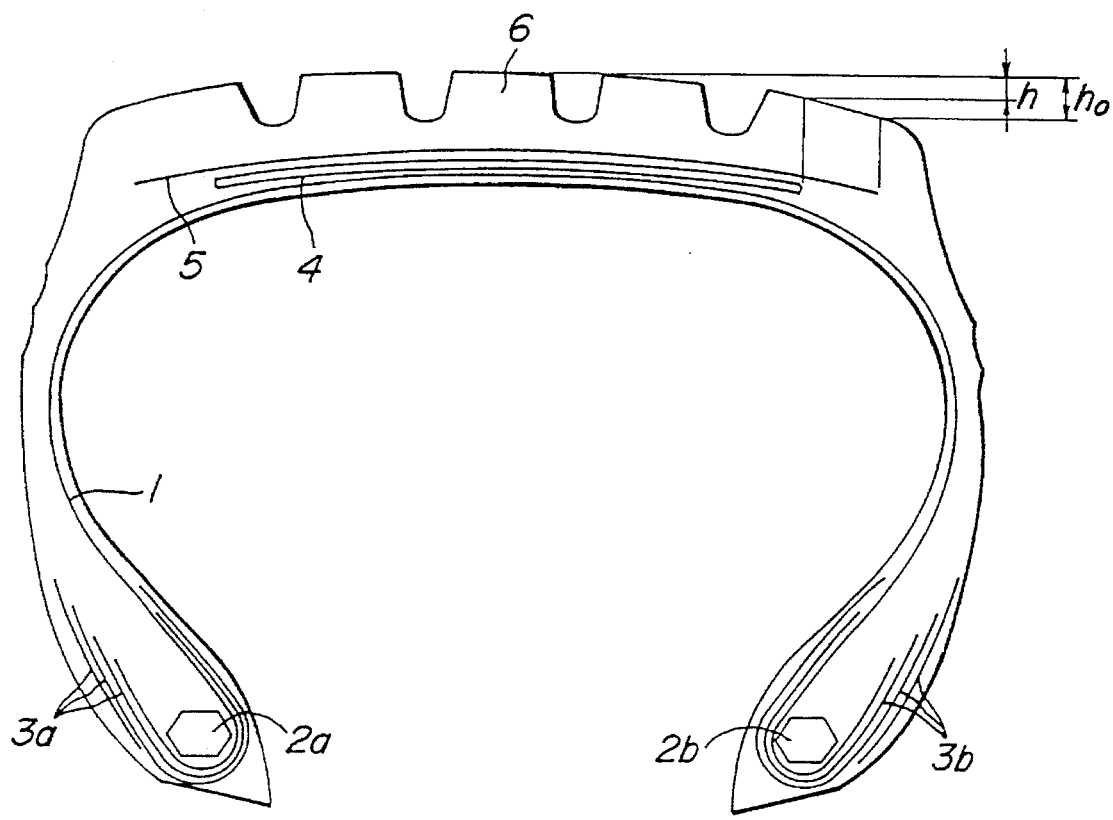
FIG. 3 is a diagrammatically sectional view of a third embodiment of the pneumatic radial tire according to the invention.

The belt reinforcing layer 5 (or 5a, 5b) arranged outside the belt 4 is comprised of at least one rubberized cord ply containing plural cords arranged in parallel with each other. In FIGS. 1 and 2, the belt reinforcing layer is formed by laminating two rubberized cord plies to cross the cords of these plies with each other, while the belt reinforcing layer in FIGS. 3 and 4 is comprised of a single rubberized cord ply. Moreover, it is important that the belt reinforcing layer 5 (or 5a, 5b) is arranged to cover each side portion of the tread including at least a tread end. In the embodiments of FIGS. 1 and 3, the belt reinforcing layer 5 is arranged to cover a region corresponding to a full width of the tread, while the belt reinforcing layer 5a or 5b is arranged to cover only a region corresponding to each side portion of the tread.

As the formation of the belt, JP-Y-48-96259 discloses a method wherein a rubberized cord strip is returned 1–4 times by a given belt width in a rotating axial direction of the tire every winding in the circumferential direction of the tire and shifted by a given strip width before or after the wound strip in the circumferential direction every the return to form a belt. According to this method, a belt as shown in FIG. 5 can be obtained. However, the above method restricts the inclination cord angle with respect to the equatorial plane of the tire to a narrow range. Therefore, if it is intended to set the inclination cord angle within a favorable range from a viewpoint of performance in accordance with the width and circumferential length of the belt, it is desirable to adjust the inclination cord angle within a wider range.

Figure 6:
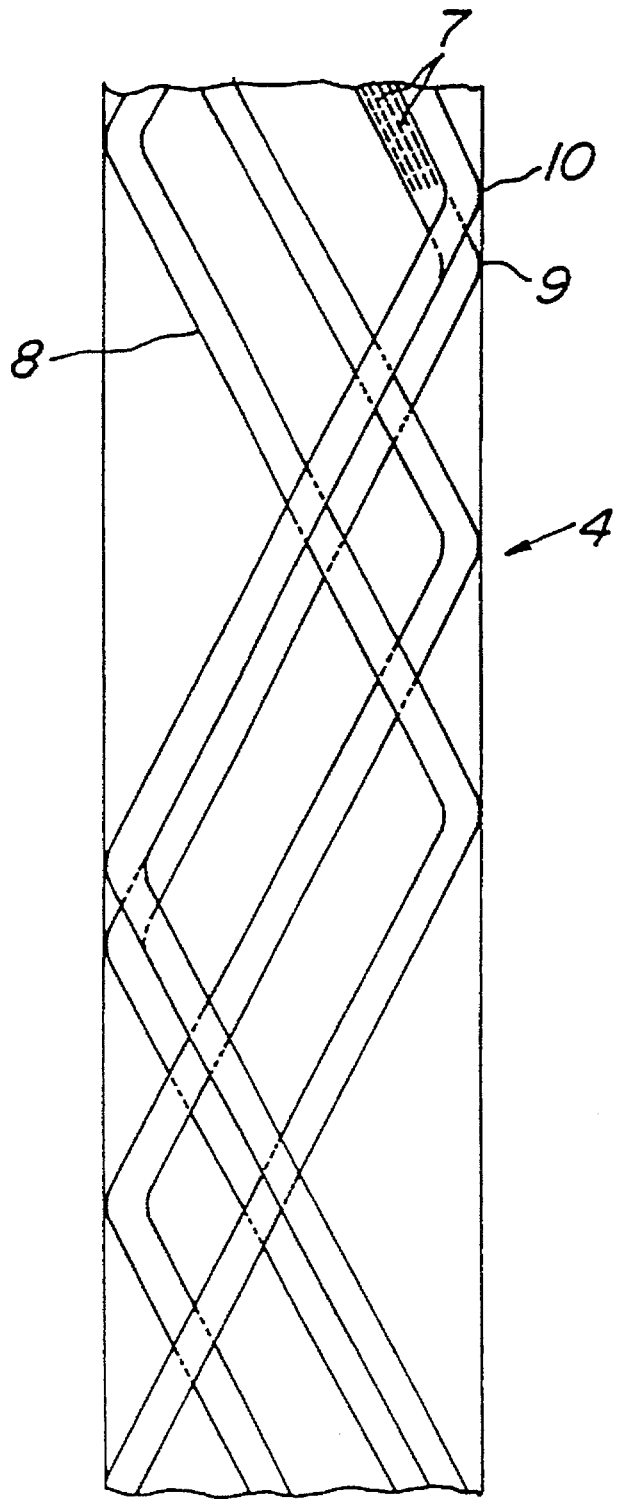
FIG. 6 is a schematic view illustrating the formation of the belt used in the invention.

In the latter case, the formation of the belt is carried out by determining a circumferential pitch for shifting a rubberized strip 8 containing one or more cords 7 therein before or after the wound strip in the circumferential direction so that an interval between a first wound strip 8 and next wound strip 8 is rendered into a given length by rotating the tire N times (integral number) every axial bending at M times (integral number) at both belt ends as shown in FIG. 6. FIG. 6 illustrates a state where the strip 8 is started from a position 9 and bent M times at both belt ends during the rotation of the tire at N times to arrive at a position 10 adjacent to the starting point 9. According to this method, it is possible to arrange the wound strip at substantially a desired inclination cord angle with respect to the equatorial plane without generating a gap between the adjacent wound strips. The belt obtained by this method is shown in FIG. 7. In this case, a crossing line 11 apparently showing an interweave of the strip 8 is created as shown in FIG. 7.

In the conventional pneumatic radial tire, a belt obtained by laminating plural rubberized cord plies each containing a great number of cords therein to cross the cords of these plies with each other (hereinafter referred to as a conventional belt) is widely used and has cut surfaces of the cords at each ply end, so that there is a problem that the belt end separation is easily caused starting from the cut surface of the cord.

As a countermeasure for solving this problem, it is effective to remove out the cut surfaces of the cords resulting in the occurrence of belt end separation by using a belt in which the cords are zigzag extended in the circumferential direction through axial bending at both belt ends (hereinafter referred to as zigzag belt). Furthermore, the zigzag belt creates no shifting of cord between upper and lower plies at the belt end and does not lower the belt tension at the belt end different from the conventional belt, so that it provides a hoop effect higher than that of the conventional belt.

In the zigzag belt, however, stretching in the circumferential direction at the belt end is very small, so that it is difficult to absorb the diameter difference between the central portion and the end portion in the widthwise direction of the tread and hence the occurrence of shoulder wear can not be avoided as previously mentioned.

The inventors have examined the relation between crown shape of the tread and rigidity of the belt on the shoulder wear in detail and acquired the following knowledge.

That is, since the stretching in the circumferential direction is very small at the belt end in the zigzag belt, it is desirable that the zigzag belt is arranged in a region having a small diameter difference to the central portion of the tread. Even if the width of the zigzag belt is made relatively narrow as compared with the conventional belt in order to develop the high hoop effect at the belt end, the zigzag belt is still possible to maintain the carcass shape and function as the belt. Further, when the belt width is made narrow, the rigidity in the circumferential direction at the shoulder portion of the tread can be reduced, whereby it is possible to absorb the diameter difference.

However, when the width-narrow zigzag belt is arranged in the tire, both side regions outside the belt (tread rubber supporting the tread end portion) are not restrained by the zigzag belt and the rubber at the tread end easily moves. As a result the slipping of the rubber at the tread end portion in the ground contact area increases to again raise a problem of shoulder wear.

To this end, a belt reinforcing layer made from a rubberized ply having a given width is arranged between the belt and the tread at a region ranging from at least an end portion of the belt to the tread end portion, whereby the movement of tread rubber at both sides of the belt is restrained to control the occurrence of shoulder wear.

As the arrangement of the belt and the belt reinforcing layer for controlling the occurrence of shoulder wear, it is advantageous that a distance h from an intersection point between a normal line of a rotational axis of the tire passing through an outermost widthwise end of the belt and an outer surface of the tread to a position of maximum tire diameter is not more than 65% of a distance $h_0$ from an intersection point between a normal line of a rotational axis of the tire passing through an outermost widthwise end of the belt reinforcing layer and an outer surface of the tread to a position of maximum tire diameter as shown in FIGS. 1 to 4.

Figure 8:
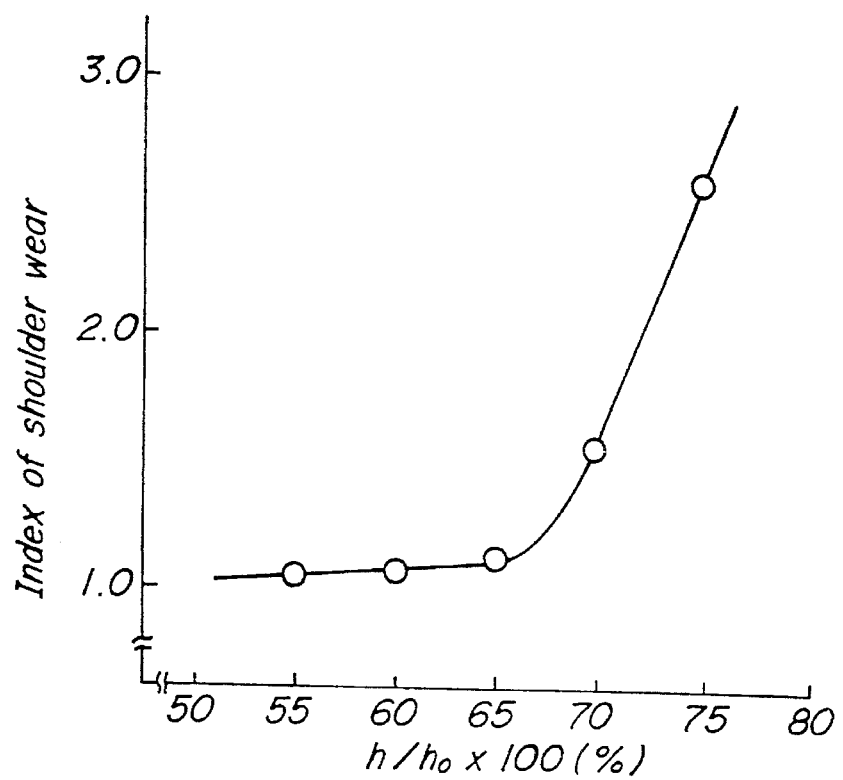
FIG. 8 is a graph showing a relation between relative position of belt and belt reinforcing layer and amount of shoulder wear generated.

In this connection, when the ratio of distance h to distance $h_0$ is varied in the same tire, the amount of shoulder wear generated is measured to obtain results as shown in FIG. 8. As seen from FIG. 8, when the ratio $h/h_0$ exceeds 65%, shoulder wear suddenly proceeds.

In order to restrain the tread rubber at the tread end portion, it is advantageous that the outermost end of the belt reinforcing layer in the widthwise direction of the belt is located near to the tread end portion, concretely within a range of 85–95% of a distance between both side ends of the ground contact area of the tread. Moreover, the position of the outermost end of the belt may be determined from the outermost end of the belt reinforcing layer as a standard. If the width of the belt is too narrow, the maintenance of the carcass shape may be obstructed, so that it is required that the width of the belt is at least 50% of the maximum width of the carcass at radial section.

Since the rigidity of the belt is high, it is preferable that the belt reinforcing layer has a two-ply structure of crossing cords of these plies with each other. However, when the belt reinforcing layer is comprised of plural plies, if the inclination cord angle of the belt reinforcing layer with respect to the equatorial plane is small, the diameter difference at the tread end arranging the belt reinforcing layer becomes large and also the deformation of the belt reinforcing layer becomes large. As a result, the interlaminar shearing strain between the belt and the belt reinforcing layer increases to facilitate the occurrence of separation between the layers. In this connection, it is desirable to reduce the interlaminar shearing strain by making the inclination cord angle of the belt reinforcing layer larger than that of the belt.

Since the belt according to the invention has no cut surface of cord resulting in the occurrence of separation failure, even if the inclination cord angle of the belt is small, belt end separation hardly occurs. Therefore, the inclination cord angle of the belt with respect to the equatorial plane is preferable to be within a range of 10°–30°. Moreover, the sufficient hoop effect is obtained even if the width of the belt is narrow as previously mentioned.

On the other hand, it is not desirable to excessively increase the circumferential rigidity of the belt reinforcing layer from a viewpoint of the reduction of shearing deformation generated at the tread end in addition to the avoidance of interlaminar separation to the belt. In this connection, the inclination cord angle of the belt reinforcing layer is preferable to be larger by at least 5° than that of the belt or within a range of 20°–50° with respect to the equatorial plane of the tire.

The following examples are given in illustration of the invention and are not intended as limitations thereof.

There are prepared four pneumatic radial tires having a tire size of 11/70 R22.5 according to a structure as shown in FIGS. 1–4 and a specification as shown in Table 1. For comparison, there is prepared a comparative tire having the same tire size according to a structure as shown in FIG. 9 and a specification as shown in table 1.

Moreover, cords of 3×0.20 mm+6×0.36 mm are used in the belt and the belt reinforcing layer. Further, the formation of the belt is carried out according to a manner shown in FIG. 6 at M=9 and N=4 or a circumferential pitch f=9/4, whereby the belt as shown in FIG. 7 is obtained.

Each of these test tires is mounted onto a rim of 7.5×22.5 size and inflated under an internal pressure of 7.5 kgf/cm². Such a tire is mounted onto an idle shaft of a so-called 2D-4 vehicle in which two tires are mounted onto each side of driving shaft and idle shaft in a rear wheel of the vehicle and run on a paved road under normal load over a distance of 20,000 km, and thereafter a worn state of the tread surface is measured. The measured results are also shown in Table 1, in which a value obtained by dividing an average of maximum worn depth in ribs at both tread ends by a maximum worn depth in a rib at the central portion of the tread is represented by an index of shoulder wear.

TABLE 1

|  |  | FIG. 1 | FIG. 2 | FIG. 3 | FIG. 4 | FIG. 9 |
| --- | --- | --- | --- | --- | --- | --- |
| Belt | end count (cords/50 mm) | 32 | 32 | 32 | 32 | 32 |
|  | inclination cord angle (°) | ±18 | ±18 | ±18 | ±18 | ±18 |
| Belt reinforcing layer | end count (cords/50 mm) | 25 | 25 | 25 | 25 | — |
|  | inclination cord angle (°) | ±30 | ±30 | ±30 | ±30 | — |
|  | $h/h_0 \times 100$ (%) | 55 | 55 | 55 | 55 | — |
| Index of shoulder wear |  | 1.05 | 0.97 | 1.25 | 1.20 | 2.45 |
|  |  |  |  | Example |  | Comparative Example |

As mentioned above, according to the invention, there can be provided pneumatic radial tires realizing the control of shoulder wear together with the avoidance of belt end separation and having an excellent durability.

We claim:

1. A pneumatic radial tire comprising a radial carcass toroidally extending between a pair of bead cores, a belt superimposed about the carcass, a belt reinforcing layer laid on the belt and a tread laid thereon, the belt formed by zigzag and continuously extending a rubberized strip containing one or more cords therein substantially in a circumferential direction of the tread to slantly extend with respect to an equatorial plane of the tire from one end to the other end at both side edges of the belt through an axially bent state at each side edge, and the belt reinforcing layer is comprised of at least one rubberized cord ply containing plural cords slantly arranged with respect to the equatorial plane in a region corresponding to at least each side region of the tread, and the belt and the belt reinforcing layer satisfy a relationship that a distance from an intersection point between a normal line of a rotational axis of the tire passing through an outermost widthwise end of the belt and an outer surface of the tread to a position of maximum tire diameter is not more than 65% of a distance from an intersection point between a normal line of a rotational axis of the tire passing through an outermost widthwise end of the belt reinforcing layer and an outer surface of the tread to a position of maximum tire diameter.

2. The pneumatic radial tire according to claim 1, wherein the belt reinforcing layer is comprised of two rubberized cord plies laminated so as to cross the cords of these plies with each other and has an inclination cord angle larger than that of the belt with respect to the equatorial plane.

3. The pneumatic radial tire according to claim 1, wherein an outermost end of the belt reinforcing layer in the widthwise direction of the belt is located within a range of 85–95% of a distance between ends of a ground contact area of the tread.

4. The pneumatic radial tire according to claim 1, wherein a width of the belt is at least 50% of a maximum width of the carcass at radial section.

5. The pneumatic radial tire according to claim 1, wherein the belt has an inclination cord angle of 10°–30° with respect to the equatorial plane of the tire.

6. The pneumatic radial tire according to claim 1, wherein the belt reinforcing layer has an inclination cord angle of 20°–50° with respect to the equatorial plane of the tire.

7. The pneumatic radial tire according to claim 2, wherein said belt reinforcing layer has an inclination cord angle at least 5° larger than that of said belt.

* * * * *